United States Patent
Kim et al.

(10) Patent No.: US 9,837,909 B2
(45) Date of Patent: Dec. 5, 2017

(54) MODE SELECTION CIRCUIT AND SWITCH CONTROL CIRCUIT INCLUDING THE MODE SELECTION CIRCUIT AND MULTI FUNCTIONS PIN

(71) Applicant: FAIRCHILD KOREA SEMICONDUCTOR LTD., Bucheon-si (KR)

(72) Inventors: Taesung Kim, Yeongtong-gu (KR); Dong-Jin Park, Bucheon-si (KR); Seung-Uk Yang, Dongan-gu (KR)

(73) Assignee: FAIRCHILD KOREA SEMICONDUCTOR LTD., Bucheon-si (KR)

( * ) Notice: Subject to any disclaimer, the term of this patent is extended or adjusted under 35 U.S.C. 154(b) by 172 days.

(21) Appl. No.: 14/447,479

(22) Filed: Jul. 30, 2014

(65) Prior Publication Data

US 2015/0035508 A1 Feb. 5, 2015

Related U.S. Application Data

(60) Provisional application No. 61/860,488, filed on Jul. 31, 2013.

(30) Foreign Application Priority Data

Jul. 21, 2014 (KR) .................. 10-2014-0092152

(51) Int. Cl.
H02M 3/335 (2006.01)

(52) U.S. Cl.
CPC .............. H02M 3/33507 (2013.01)

(58) Field of Classification Search
CPC .. H02M 3/156; H02M 3/157; H02M 3/33507; H02M 2001/0032; H02M 2001/0035; H02M 2003/1566
USPC ................. 323/282, 283; 363/21.05, 21.12
See application file for complete search history.

(56) References Cited

U.S. PATENT DOCUMENTS

| | | | |
|---|---|---|---|
| 5,455,758 A | 10/1995 | Pelly | |
| 5,767,631 A | 6/1998 | Konopka et al. | |
| 5,859,768 A * | 1/1999 | Hall | H02M 3/33507 363/21.13 |
| 6,188,274 B1 | 2/2001 | Vernon | |
| 6,359,715 B1 | 3/2002 | Imajo | |
| 6,984,963 B2 | 1/2006 | Pidutti et al. | |
| 7,525,259 B2 | 4/2009 | Weirich | |
| 2001/0024113 A1 | 9/2001 | Goyhenetche et al. | |
| 2003/0205974 A1 | 11/2003 | Kuehner et al. | |
| 2005/0190586 A1 | 9/2005 | Radzinski et al. | |
| 2005/0212587 A1 | 9/2005 | Meek et al. | |
| 2010/0208500 A1 | 8/2010 | Yan et al. | |
| 2010/0302815 A1* | 12/2010 | Li | H02M 3/33523 363/21.09 |

(Continued)

FOREIGN PATENT DOCUMENTS

EP 2765697 A1 * 8/2014 ........ H02M 3/33507

*Primary Examiner* — Alex Torres-Rivera
(74) *Attorney, Agent, or Firm* — Okamoto & Benedicto LLP

(57) ABSTRACT

A mode selection circuit generates a mode voltage according to a clamping current flowing when a voltage of a multi-pin is clamped to a predetermined clamping voltage, and selects one of a plurality of mode signals according to the mode voltage. The mode voltage is controlled according to a passive element connected to the multi-pin.

20 Claims, 9 Drawing Sheets

(56) References Cited

U.S. PATENT DOCUMENTS

| | | |
|---|---|---|
| 2011/0261596 A1 | 10/2011 | Zong et al. |
| 2011/0286248 A1 | 11/2011 | Wang et al. |
| 2012/0025802 A1 | 2/2012 | Carmen |
| 2012/0075891 A1 | 3/2012 | Zhang et al. |
| 2012/0243269 A1* | 9/2012 | Ren ................... H02M 3/33507 363/21.12 |
| 2012/0250378 A1* | 10/2012 | Kok ..................... H02M 3/156 363/78 |
| 2013/0294118 A1 | 11/2013 | So et al. |
| 2013/0308350 A1 | 11/2013 | Huang et al. |
| 2014/0225532 A1* | 8/2014 | Groeneveld ....... H05B 33/0815 315/307 |
| 2015/0043252 A1* | 2/2015 | Kuang .............. H02M 3/33507 363/21.16 |

\* cited by examiner

MODE SELECTION CIRCUIT AND SWITCH CONTROL CIRCUIT INCLUDING THE MODE SELECTION CIRCUIT AND MULTI FUNCTIONS PIN

CROSS-REFERENCE TO RELATED APPLICATION

This application claims priority to and the benefit of U.S. Patent Application No. 61/860,488 filed in the USPTO on Jul. 31, 2013, and priority to and the benefit of Korean Patent Application No. 10-2014-0092152, filed with the Korean Intellectual Property Office on Jul. 21, 2014, the entire contents of which are incorporated herein by reference.

BACKGROUND (a) Field of the Invention

Exemplary embodiments relate to a mode selection circuit and a switch control circuit including the mode selection circuit and a multi-function pin.

(b) Description of the Related Art

Prior to operation of a converter, a mode may be selected. Mode selection implies determination of an operation mode of a control IC. Parameters are set or thorough functions of the control IC are determined through mode selection.

For such mode selection, a conventional control IC includes an additional structure and a mode is selected through an additional process through the additional structure. For example, prior to operation of a converter, an internal current source of the control IC is connected to a specific pin of the control IC and an operation mode is selected by a voltage of the specific pin. After that, start-up operation is performed. Thus, an additional current source is required and a start-up period is increased due to a connection period between the specific pin and the internal current source.

The above information disclosed in this Background section is only for enhancement of understanding of the background of the invention and therefore it may contain information that does not form the prior art that is already known in this country to a person of ordinary skill in the art.

SUMMARY OF THE INVENTION

The invention has been made in an effort to provide a mode selection circuit that can select a mode without an additional structure and an additional process, and a switch control circuit including the mode selection circuit and a multi-functional pin.

A mode selection circuit according to an exemplary embodiment includes: a mode voltage generator configured to generate a mode voltage according to a clamping current that flows when a voltage of a multi-pin is clamped to a predetermined clamping voltage; and an operation mode distinction circuit configured to select one of a plurality of mode signals according to the mode voltage. The mode voltage is controlled according to a passive element connected to the multi-pin.

The mode voltage generator further includes a clamping circuit that clamps the voltage of the multi-pin to the clamping voltage when being connected to the multi-pin.

The mode voltage generator includes a comparator configured to compare the voltage of the multi-pin with a predetermined reference voltage and a clamping circuit configured to clamp the voltage of the multi-pin to the clamping voltage. Connection between the clamping circuit and the multi-pin may be controlled according to an output of the comparator and an enabled mode signal of among the plurality of mode signals.

The mode voltage generator includes a connection switch connected between the multi-pin and the clamping circuit, and turns on the connection switch according to the output of the comparator and turns off the connection switch according to the enabled mode signal.

The mode selection circuit may further include a logic operation unit that turns on the connection switch according to the output of the comparator when the voltage of the multi-pin reaches the predetermined reference voltage and turns off the connection switch according to the enabled mode signal.

The mode selection circuit further includes a current mirror circuit configured to generate a mirror current by mirroring the clamping current and a resistor to which the mirror current flows, wherein the mode voltage is a voltage generated in the resistor.

The operation mode distinction circuit includes: a plurality of first comparators configured to compare whether the mode voltage is lower than a corresponding threshold voltage among a plurality of first threshold voltages; a plurality of second comparators configured to compare whether the mode voltage is higher than a corresponding threshold voltage among a plurality of second threshold voltages; and a plurality of logic operation units configured to perform logic operation on an output of a third comparator among the plurality of first comparators and an output of a fourth comparator that corresponds to the third comparator among the plurality of second comparators. The plurality of mode selection signals include outputs of the plurality of logic operation units.

The plurality of mode selection signals include: an output of a comparator comparing a lowest first threshold voltage with the mode voltage among the plurality of first comparators; and an output of a comparator comparing a highest second threshold voltage with the mode voltage among the plurality of second comparators.

The mode voltage generator may further include a clamping circuit configured to clamp a voltage of the multi-pin to a predetermined clamping voltage when being connected to the multi-pin and a sampling/holder configured to sample the voltage of the multi-pin for a predetermined period and hold the sampled voltage. The mode selection circuit controls connection between the clamping circuit and the multi-pin according to a result of comparison between the held voltage and a predetermined reference voltage.

A switch control circuit according to an exemplary embodiment controls switching operation of a power switch. The switch control circuit includes a multi-pin connected to a passive element and a mode selection circuit configured to generate a mode voltage according to a clamping current flowing when a voltage of the multi-pin is clamped to a predetermined clamping voltage and select one of a plurality of mode signals according to the mode voltage.

The switch control circuit further includes a first connection switch connected between the multi-pin and an internal block of the switch control circuit, and the mode selection circuit includes a clamping circuit configured to clamp the voltage of the multi-pin to the clamping voltage; and a second connection switch connected between the multi-pin and the clamping voltage. The mode selection circuit controls switching operation of the first and second connection switches according to an enabled mode signal among the plurality of mode signals and a result of comparison between the voltage of the multi-pin and a predetermined reference voltage.

The mode selection circuit may further include a logic operation unit that turns off the first connection switch and turns on the second connection switch according to an output of the result of comparison when the voltage of the multi-pin reaches the reference voltage and turns on the first connection switch and turns off the second connection switch according to an enabled mode selection signal among the plurality of mode selection signals.

The mode selection circuit includes a current mirror circuit configured to generate a mirror current by mirroring the clamping current and a resistor to which the mirror current flows, and the mode voltage is a voltage generated in the resistor.

The mode selection circuit includes: a plurality of first comparators configured to compare whether the mode voltage is lower than a corresponding first threshold voltage among a plurality of first threshold voltages; a plurality of second comparators configured to compare whether the mode voltage is higher than a corresponding second threshold voltage among the plurality of second threshold voltages; and a plurality of logic operation units configured to perform logic operation on an output of a third comparator among the plurality of first comparators and an output of a fourth comparator that corresponds to the third comparator among the plurality of second comparators. The plurality of mode selection signals include outputs of the plurality of logic operation units.

The plurality of mode selection signals include an output of a comparator comparing a lowest first threshold voltage with the mode voltage among the plurality of first comparators and an output of a comparator comparing a highest second threshold voltage with the mode voltage among the plurality of second comparators.

The mode selection circuit includes a clamping circuit configured to clamp a voltage of the multi-pin to a predetermined clamping voltage when being connected to the multi-pin and a sampling/holder configured to sample the voltage of the multi-pin for every switching cycle of the power switch during a turn-off period of the power switch and hold the sampled voltage. The mode selection circuit controls connection between the clamping circuit and the multi-pin according to a result of comparison between the held voltage and a predetermined reference voltage.

The multi-pin may be connected to an auxiliary wire coupled to a primary side wire that is connected to the power switch. Alternatively, the multi-pin may be connected to an output voltage of a power supply that includes the power switch. Alternatively, the multi-pin may be connected to a line voltage.

The mode voltage may be controlled according to the passive element.

A switch control circuit according to an exemplary embodiment controls switching operation of a power switch. The switch control circuit includes: a gate-pin connected to a gate of the power switch and a first resistor; a voltage source connected to the gate pin through a switch; and a mode selection circuit configured to generate a mode voltage according to a first current flowing between the voltage source and the gate-pin when the power switch is turned on, and select one of a plurality of mode signals according to the mode voltage. The first current may be determined according to the voltage source and the first resistor.

A switch control circuit according to an exemplary embodiment controls switching operation of a power switch.

The switch control circuit includes: a gate pin connected to a gate of the power switch and a first resistor; a current source connected to the gate pin; and a mode selection circuit configured to select one of a plurality of mode signals according to a gate voltage that turns on the power switch. The gate voltage may be determined according to the first resistor and a current of the current source.

According to the exemplary embodiments, a mode selection circuit that can select a mode without an additional structure and an additional process, and a switch control circuit including the mode selection circuit and a multi-functional pin can be provided.

DETAILED DESCRIPTION OF THE EMBODIMENTS

Figure 1:
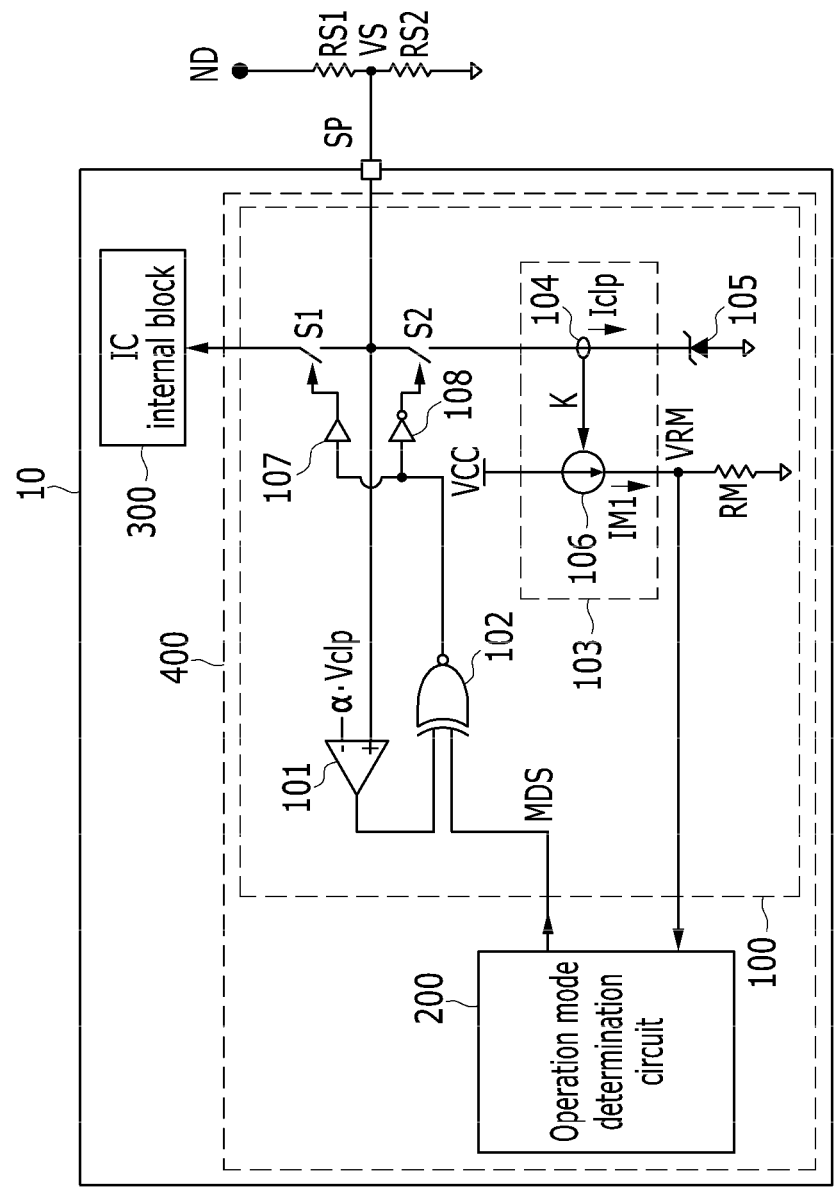
FIG. 1 shows a switch control circuit according to a first exemplary embodiment.

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

A switch control circuit according to an exemplary embodiment includes a plurality of pins, and at least one of the plurality of pins performs multi-functions. Mode selection is performed through the multi-pin. Mode selection includes selection of one of at least two functions that can be performed by a constituent element included in the switch control circuit and operation for setting a plurality of parameters set in the switch control circuit.

For example, a protection structure of the switch control circuit may be selected to one of an over-voltage protection function and an over-current protection function through the mode selection. In addition, reference voltages corresponding to the plurality of parameters can be set through the mode selection.

First, exemplary embodiments in which mode selection is performed through a sense pin included in the switch control circuit will be described.

FIG. 1 shows a switch control circuit according to a first exemplary embodiment.

A switch control circuit 10 includes an IC internal block 300 and a mode selection circuit 400.

A sense pin SP shown in FIG. 1 is a pin for sensing a voltage at a specific node ND. The sense pin SP is a multi-pin in the exemplary embodiment. A voltage sensed through the node ND may be one of various voltages such as a voltage corresponding to an input voltage, a voltage corresponding to an output voltage, and a voltage corresponding to an output current. Two resistors RS1 and RS2 are connected in series between the node ND and a ground, and a node to which the two resistors RS1 and RS2 are connected is connected to the sense pin SP.

The switch control circuit 10 includes a mode voltage generator 100 and an operation mode distinction circuit 200, and other constituent elements except for the mode voltage generator 100 and the operation mode distinction circuit 200 are illustrated as the IC internal block 300.

The mode selection circuit 400 selects an operation mode of the switch control circuit 10 using a sense voltage VS input through the sense pin SP, and includes a mode voltage generator 100 and an operation mode distinction circuit 200.

The mode voltage generator 100 according to the exemplary embodiment clamps the sense voltage VS input through the sense pin SP to a predetermined clamping voltage VCLP, and mirrors a current generated by clamping the sense voltage VS to generate a mode voltage VRM.

The operation mode distinction circuit 200 selects an operation mode according to a level of the mode voltage VRM, and generates a mode selection signals MDS that indicates a selected operation mode. The mode selection signals MDS may include a plurality of mode selection signals respectively indicating a plurality of modes.

The mode voltage generator 100 includes a first connection switch S1, a second connection switch S2, a comparator 101, an XNOR gate 102, a current mirror circuit 103, a clamping circuit 105, a buffer 107, an inverter 108, and a resistor RM.

The current mirror circuit 103 includes a current sensing unit 104 and a current source 106. A clamping current Iclp flowing through the current sensing unit 104 is mirrored and then transmitted to the current source 106, and in this case, a mirroring ratio may be K. The current source 106 generates a mirrored current K*Iclp. Hereinafter, the mirrored current is referred to as a mirror current IM1.

The mirror current IM1 flows to the resistor RM, and the mode voltage VRM is generated in the resistor RM. The voltage VRM can be represented as K*Iclp*RM. A voltage source VCC supplies a voltage required for generation of the mirror current IM1 of the current source 106.

When the sense voltage VS reaches a voltage α*Vclp acquired by multiplying a predetermined ratio α to the clamping voltage Vclp, the first connection switch S1 is turned off and the second connection switch S2 is turned on. The clamping voltage Vclp is a Zener voltage of the clamping circuit 105. The predetermined ratio may be appropriately set according to a design. The voltage (α*Vclp) is an example of a reference voltage, and it is not restrictive.

When the sense voltage VS reaches the voltage (α*Vclp), the comparator 101 outputs a high level, and since inputs of the XNOR gate 102 have different logic levels, the XNOR gate 102 outputs a low level. The buffer 107 turns off the first connection switch S1 according to the output of the XNOR gate 102, and the inverter 108 turns on the second connection switch S1 by inverting the output of the XNOR gate 102.

When the two inputs are different from each other, the XNOR gate 102 outputs a low level, and when the two inputs are the same, the XNOR gate 102 outputs a high level. The XNOR gate 102 is described as an example of a logic operation unit for controlling switching operation of the second connection switch S2, and the exemplary embodiment of the invention is not limited thereto.

Then, the sense pin SP is connected to the clamping circuit 105, and the sense voltage VS of the sense pin SP is clamped to the clamping voltage Vclp. In this case, the clamping current Iclp flows through the clamping circuit 105.

Since current flowing to the resistor RS1 flows to the resistor RS2 right before the clamping current Iclp flows, a current flowing to the ground from the node ND is α*Vclp/RS2. When the clamping current Iclp flows, the current flowing to the resistor RS2 is Vclp/RS2, and therefore the current flowing to the ground through the clamping circuit 105 from the sense pin SP becomes α*Vclp/RS2−Vclp/RS2 as given in Equation 1.

$$Iclp = \alpha - 1 * Vclp/RS2 \quad \text{[Equation 1]}$$

The clamping circuit 105 can be implemented as a Zener diode, and, as a Zener voltage of a Zener diode, the clamping voltage Vclp is a fixed in the switch control circuit 10. In addition, the ratio α is also fixed in the switch control circuit 10. However, RS2, that is, a resistance value of the resistor RS2 is adjustable as an external component of the switch control circuit 10 connected through the sense pin SP. Thus, the clamping current Iclp can be controlled by changing the resistance value of the resistor RS2, and the mirror current IM1 is determined according to the clamping current Iclp such that the mode voltage VRM can be controlled as given in Equation 2.

$$VRM = K * Iclp * RM \quad \text{[Equation 2]}$$

Here, RM implies resistance of the RM. K and RM are also fixed in the switch control circuit 10. That is, the mode selection signals MDS can be controlled by changing resistance of the resistor RS2.

The operation mode distinction circuit 200 selects one of a plurality of operation modes according to a level of the mode voltage VRM and enables a mode selection signal MDS that instructs the selected operation mode. For example, an enable level of the mode selection signal MDS may be a high level.

Since an output of the comparator 101 is latched to high level and the mode selection signal MD is high level, all inputs of the XNOR gate 102 become high level and the XNOR gate 102 accordingly outputs a high level. Then, the first connection switch S1 is turned on and the second connection switch S2 is turned off.

As described, the mode voltage VRM is determined according to a clamping current Iclp generated when the sense voltage VS reaches the predetermined voltage α*Vclp and the clamping current Iclp is controlled according to the resistor RS2, and therefore a mode of the switch control circuit 10 can be simply selected according to a resistance value of the resistor RS.

Hereinafter, a second exemplary embodiment in which a sense pin SP senses an output voltage will be described.

Figure 2:
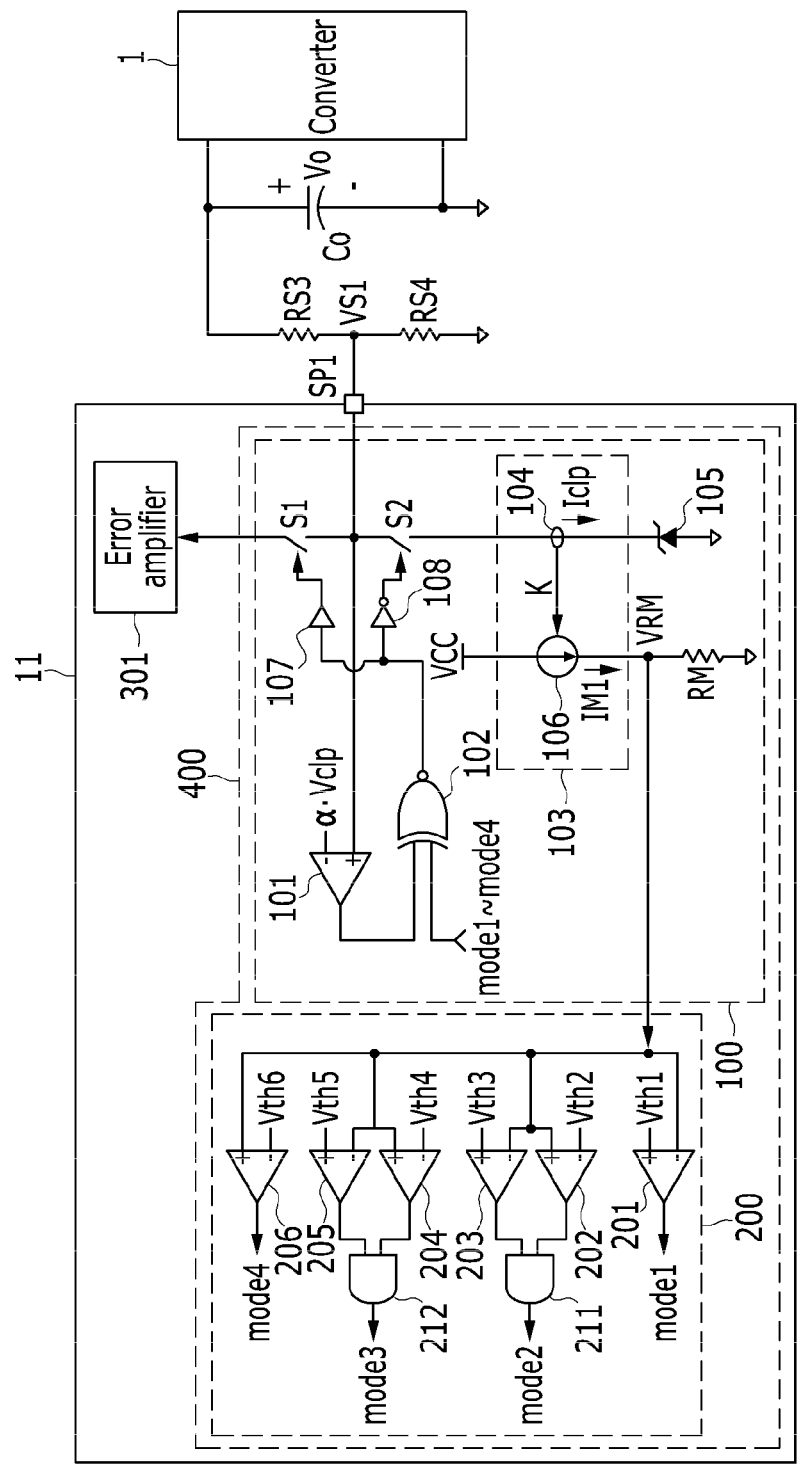
FIG. 2 shows a switch control circuit and a converter according to a second exemplary embodiment.

FIG. 2 shows a switch control circuit and a converter according to a second exemplary embodiment.

A switch control circuit 11 includes an error amplifier 301 and a mode selection circuit 400.

As shown in FIG. 2, a sense pin SP1 of the switch control circuit 11 is connected to a sense voltage VS1 that corresponds to an output voltage Vo of the converter 1. A resistor RS3 and a resistor RS4 are connected in series between the output voltage Vo and a ground. An output capacitor Co filters a ripple of the output voltage Vo of the converter 1.

The same reference numerals and marks designate the same elements in the first exemplary embodiment, and a detailed description thereof will be omitted hereinafter.

When the sense voltage VS1 reaches a voltage ($\alpha$*Vclp), a comparator 101 outputs a high level. An XNOR gate 102 outputs a low level according to the output of the comparator 101 and a low-level mode signal which is in a disable state. Then, a first connection switch S1 is turned off and a second connection switch S2 is turned on.

Then, the sense pin SP1 is connected to a clamping circuit 105, and the sense voltage VS1 of the sense pin SP1 is clamped to a clamping voltage Vclp. A clamping current Iclp flows through the clamping circuit 105 and mirrored by a current mirror circuit 103 such that a mirror current IM1 is generated. Then a mode voltage VRM is generated as given in Equation 2.

The operation mode distinction circuit 200 receives the mode voltage VRM, and generates a plurality of mode signals mode1 to mode4 which are examples of mode selection signals. The operation mode distinction circuit 200 transmits a mode signal enabled by the mode voltage VRM to an input terminal of the XNOR gate 102.

The operation mode distinction circuit 200 includes a plurality of comparators 201 to 206 and two AND gates 211 and 212. The comparators 201 to 206 output a high level when an input of a non-inversion terminal (+) is higher than an input of an inversion terminal (−), and outputs a low level in the opposite case. The AND gates 211 and 212 output a high level when both of the two inputs are high levels. Otherwise, the AND gates 211 and 212 output a low level.

The comparator 201 generates a mode signal mode1 according to a result of comparison between the mode voltage VRM and a first threshold voltage VTH1. The mode voltage VRM is input to an inversion terminal (−) of the comparator 201, and the first threshold voltage VTH1 is input to a non-inversion terminal (+) of the comparator 201. Thus, the comparator 201 generates a high-level mode signal mode1, which is an enable level, when the mode voltage VRM is lower than the first threshold voltage VTH1.

The comparator 202 outputs a result of comparison between the mode voltage VRM and a second threshold voltage VTH2, and the comparator 203 outputs a result of comparison between the mode voltage VRM and a third threshold voltage VTH3. The mode voltage VRM is input to a non-inversion terminal (+) of the comparator 202 and an inversion terminal (−) of the comparator 203, the second threshold voltage VTH2 is input to an inversion terminal (−) of the comparator 202, and the third threshold voltage VTH3 is input to a non-inversion terminal (+) of the comparator 203

In this case, the third threshold voltage VTH3 may be higher than the second threshold voltage VTH2.

Then, when the mode voltage VRM is higher than the second threshold voltage VTH2 and lower than the third threshold voltage VTH3, the comparator 202 and the comparator 203 both output high levels. When the mode voltage VRM is lower than the second threshold voltage VTH2, the comparator 202 outputs a low level and the comparator 203 outputs a high level. When the mode voltage VRM is higher than the third threshold voltage VTH3, the comparator 203 outputs a low level and the comparator 202 outputs a high level.

The AND gate 211 generates a mode signal mode2 according to the output of the comparator 202 and the output of the comparator 203. When the mode voltage VRM is higher than the second threshold voltage VTH2 and lower than the third threshold voltage VTH3, the comparator 202 and the comparator 203 both output high levels, and therefore the AND gate 211 generates a high-level, which is, an enable level mode signal mode2.

The comparator 204 outputs a result of comparison between the mode voltage VRM and a fourth threshold voltage VTH4, and the comparator 205 outputs a result of comparison between the mode voltage VRM and the fifth threshold voltage VTH5. The mode voltage VRM is input to a non-inversion terminal (+) of the comparator 204 and an inversion terminal (−) of the comparator 205, the fourth threshold voltage VTH4 is input to an inversion terminal (−) of the comparator 204, and the fifth threshold voltage VTH5 is input to a non-inversion terminal (+) of the comparator 205. In this case, the fifth threshold voltage VTH5 may be higher than the fourth threshold voltage VTH4.

Thus, when the mode voltage VRM is higher than the fourth threshold voltage VTH4 and lower than the fifth threshold voltage VTH5, the comparator 204 and the comparator 205 both output high levels. When the mode voltage VRM is lower than the fourth threshold voltage VTH4, the comparator 204 outputs a low level and the comparator 205 outputs a high level. When the mode voltage VRM is higher than the fifth threshold voltage VTH5, the comparator 205 outputs a low level and the comparator 204 outputs a high level.

The AND gate 212 generates a mode signal mode3 according to the output of the comparator 204 and the output of the comparator 205. When the mode voltage VRM is higher than the fourth threshold voltage VTH4 and lower than the fifth threshold voltage VTH5, the comparator 204 and the comparator 205 both output high levels, and therefore the AND gate 121 generates a high-level mode signal mode3, which is an enable-level mode signal mode3.

The comparator 206 generates a mode signal mode4 according to a result of comparison between the mode voltage VRM and a sixth threshold voltage VTH6. The mode voltage VRM is input to a non-inversion terminal (+) of the comparator 206 and the sixth threshold voltage VTH1 is input to an inversion terminal (−) of the comparator 206. Thus, the comparator 206 generates a high-level mode signal mode4, which is an enable-level mode signal mode4 when the mode voltage VRM is higher than the sixth threshold voltage VTH6.

As described, according to the second exemplary embodiment, mode selection can be performed using the sense pin SP1 that senses the output voltage Vo.

When a mode is selected and one of the mode signals mode1 to mode4 is enabled, all inputs of the XNOR gate 102 become high levels so that the first connection switch S1 is turned on and the second connection switch S2 is turned off.

Then, the sense voltage VS1 is input to the error amplifier 301, and the error amplifier 301 may generate an error voltage by amplifying a difference between the sense voltage VS1 and a predetermined reference voltage. The switch control circuit 11 can control switching operation of the power switch according to the error voltage.

A sense voltage transmitted through the sense pin may be a voltage corresponding to an input voltage or an output voltage according to the switching operation of the power switch. A sense voltage of a turn-on period and a sense voltage of a turn-off period may need to be selected.

In a third exemplary embodiment, a sense voltage is sampled and held during a turn-off period of a power switch, and a mode selection may be performed according to the held voltage.

Figure 3:
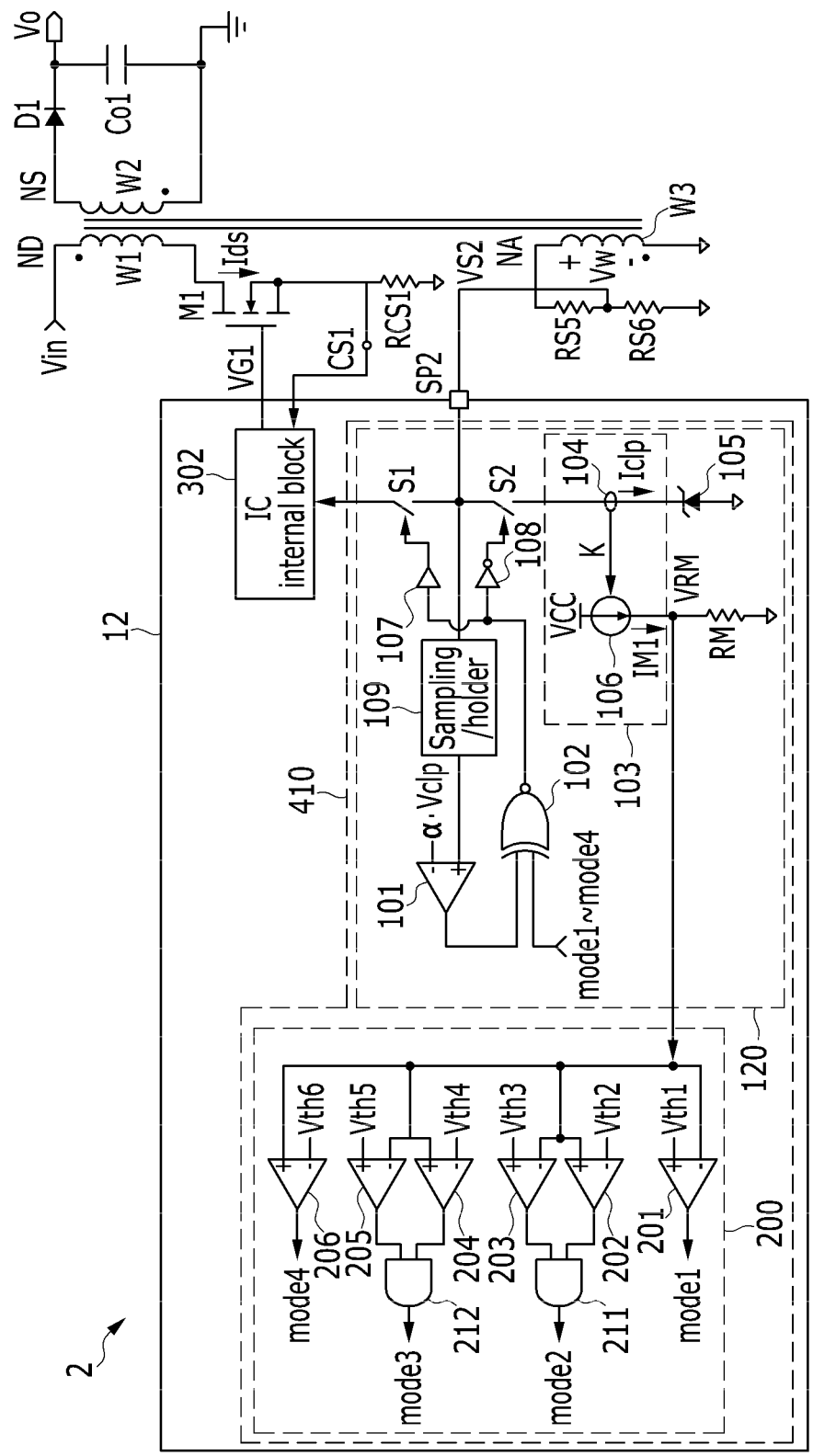
FIG. 3 shows a power supply according to a third exemplary embodiment.

FIG. 3 shows a power supply according to a third exemplary embodiment.

A switch control circuit 12 includes an IC internal block 302 and a mode selection circuit 410. The mode selection circuit 410 according to the third exemplary embodiment further includes a sampling/holder 109 compared to the first and second exemplary embodiments.

The same reference numerals and marks as those of the first and second exemplary embodiment will be used for the same elements and a detailed description thereof will not be repeated in the following description.

A power supply 2 is exemplarily implemented as a flyback converter, and the second exemplary embodiment is not limited thereto.

The power supply 2 generates an output voltage Vo using an input voltage Vin rectified from an AC input.

A power switch M1 performs switching operation according to a gate voltage VG1 output from a switch control circuit 12. The power switch M1 is an n-channel type, and therefore, an enable level of the gate voltage VG1 is a high level and a disable level of the gate voltage VG1 is a low level.

The input voltage Vin is supplied to one end of a primary side wire W1, and the other end of the primary side wire W1 is connected to a drain of the power switch M1. A current flowing to the primary side wire S1 is increased with an inclination that depends on the input voltage Vin during a turn-on period of the power switch M1. During the turn-on period of the power switch M1, energy is stored in the primary side wire W1. When the power switch M1 is turned off, a diode is conductive and thus a current flows to the secondary side wire W2.

A sense resistor RCS1 is connected between a source of the power switch M1 and a primary side ground. A switch current Ids flowing to the power switch M1 flows to the sense resistor RCS1. A voltage generated in the sense resistor RCS1 is referred to as a sense voltage CS1.

The secondary side wire W2 is coupled in an insulated manner with the primary side wire W1, and a turn ratio n between the primary side wire W1 and the secondary side wire W2 corresponds to NS/NP. NS is turns of the secondary side wire W2 and NP is turns of the primary side wire W1. One end of the secondary side wire W2 is connected to the diode D1 and the other end of the secondary side wire W2 is connected to a secondary side ground.

The diode D1 is connected between the secondary side wire W2 and an output terminal. A cathode of the diode D1 is connected to the output terminal and an output capacitor Co1.

The output capacitor Co1 is connected between the output terminal and the secondary side ground and reduces a ripple of an output voltage Vo. The output capacitor Co1 is charged by a current passed through the diode D1.

An auxiliary wire W3 is coupled with the primary side wire W1 in the primary side ground, and is coupled in an insulated manner with the secondary side wire W2. A turn ratio n1 between turns (NA) of the auxiliary wire W3 and turns (NP) of the primary side wire W1 is NA/NP.

The secondary side wire W2 is connected to the output voltage Vo through the diode D1, and a turn ratio n2 between turns (NS) of the secondary side wire W2 and turns (NA) of the auxiliary wire W3 is NA/NS.

Two resistors RS5 and RS6 are connected in series between the auxiliary wire W3 and the primary side ground, and a voltage of a node to which the two resistors RS5 and RS6 are connected is referred to as a sense voltage VS2.

When the power switch M1 is in the turn-on state, a voltage of the primary side wire W1 becomes the input voltage Vin, and a negative voltage (−n1*Vin) acquired by multiplying a turn ratio n1 to the input voltage Vin is generated as a voltage Vw (hereinafter, referred to as an auxiliary voltage) of the auxiliary wire W3.

When the power switch M1 is in the turn-off state, a voltage of the secondary side wire W2 becomes a voltage acquired by adding a forward voltage VF of the diode D1 to the output voltage Vo. The auxiliary voltage VA becomes a positive voltage positive voltage (Vo+VF)*n2 that is acquired by multiplying a turn ratio n2 to a voltage of the secondary side wire W2. The forward voltage VF is a very low voltage compared to the output voltage Vo, and the auxiliary voltage VA is substantially Vo*n2. Thus, the sense voltage VS2 is Vo*n2*RS6/(RS5+RS6).

The switch control circuit 12 generates the gate voltage VG1 according to the sense voltage CS1 and the sense voltage VS2. For example, when the sense voltage CS1 reaches a feedback voltage, the switch control circuit 12 turns off the power switch M1 and may generate the feedback voltage using the sense voltage VS2.

The mode voltage generator 120 according to the third exemplary embodiment further includes the sampling/holder 109 compared to the previous exemplary embodiments.

The sampling/holder 109 receives the sense voltage VS2 through a sense pin SP2, and samples and holds the sense voltage VS2 of the turn-off period of the power switch M1. For example, the sampling/holder 109 samples and holds the sense voltage VS2 of the turn-off period of the power switch M1 for every switching period. In detail, the sampling/holder 109 may sample the sense voltage VS2 at an instant that no current flows to the diode D1 during the turn-off period of the power switch M1, and may hold the sampled voltage.

When the held voltage reaches a voltage ($\alpha$*Vclp), the comparator 101 outputs a high level. The XNOR gate 102 outputs a low level according to the output of the comparator 101 and a low-level mode signal, which is in a disable state. Then, the first connection switch S1 is turned off and the second connection switch S2 is turned on.

Then, the sense pin SP2 is connected to the clamping circuit 105, and the sense voltage VS2 is clamped to a clamping voltage Vclp. A clamping current Iclp flows through the clamping circuit 105 and then mirrored by a current mirror circuit 103 such that a mirror current IM1 is generated. Then, a mode voltage VRM is generated as given in Equation 2.

The operation mode distinction circuit 200 receives the mode voltage VRM, and generates a plurality of mode signals mode1 to mode4, which are examples of the plurality of mode selection signals. The operation mode distinction circuit 200 transmits a mode signal enabled by the mode voltage VRM to an input terminal of the XNOR gate 102. A detailed structure of the operation mode distinction circuit 200 is the same as that of second exemplary embodiment, and therefore no further description will be provided.

When mode selection is finished and thus one of the mode signals mode1 to mode4 is enabled, all input of the XNOR gate 102 become high levels so that the first connection switch S1 is turned on and the second connection switch S2 is turned off.

Then, the sense voltage VS2 is input to an IC internal block 302, and the IC internal block 302 generates a feedback voltage according to the sense voltage VS2. The IC internal block 302 may determine a turn-on time of the power switch M1 through detection of zero voltage of the sense voltage VS2. In addition, the power switch M1 may be turned off at an instant that the sense voltage CS1 reaches the feedback voltage.

The power supply of the third exemplary embodiment is implemented as a flyback converter, but the third exemplary embodiment is not limited thereto. A different type of power supply is provided in a fourth exemplary embodiment.

Figure 4:
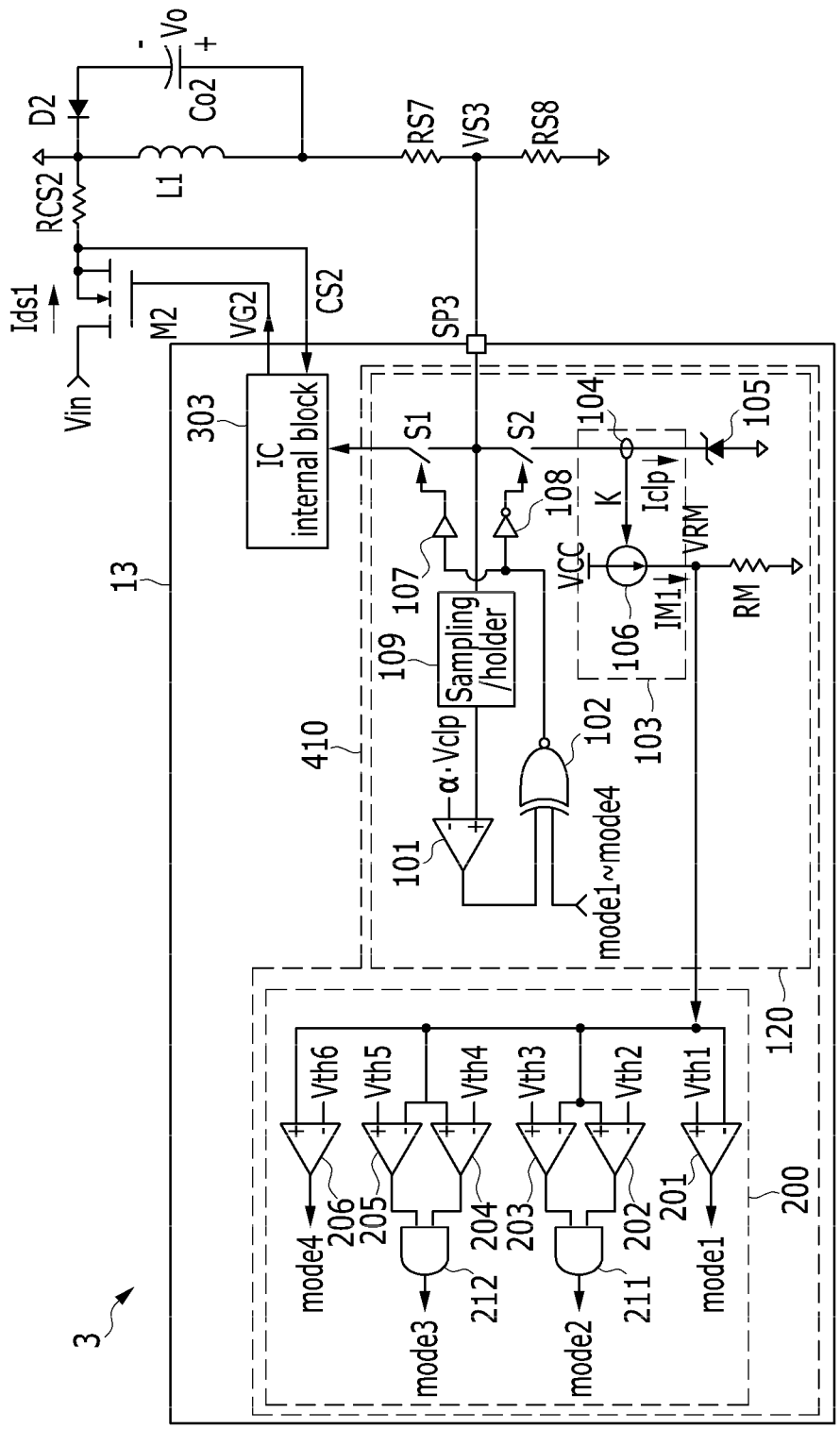
FIG. 4 shows a power supply according to a fourth exemplary embodiment.

FIG. 4 shows a power supply according to a fourth exemplary embodiment.

As shown in FIG. 4, a power supply 3 includes a power switch M2, an inductor L1, an output capacitor Co2, and a diode D2. A switch control circuit 13 includes an IC internal block 303 and a mode selection circuit 410.

A drain of the power switch M2 is connected to an input voltage, and the power switch M2 performs switching operation according to a gate voltage VG2. A source of the power switch M2 is connected to a first end of a sense resistor RCS2 and a second end of the sense resistor RCS2 is connected to a ground. A first end of the inductor L1 is connected to the second end of the sense resistor RCS2 and a second end of the inductor L1 is connected to a first electrode of an output capacitor Co2. An anode of the diode D2 is connected to a second electrode of the output capacitor Co2. A cathode of the diode D2, the second end of the sense resistor RCS2, and the first end of the inductor L1 are connected to the ground. A voltage between lateral ends of the output capacitor Co2 is an output voltage Vo.

A sense pin SP3 of the switch control circuit 13 is connected to a sense voltage VS3 generated by resistance-dividing the output voltage Vo. A resistor RS7 and a resistor RS8 are connected in series between the output voltage Vo and the ground.

When the power switch M2 is turned on, a switch current Ids1 flows to the inductor L1 and energy is stored in the inductor L1. The switch current Ids1 passed through the inductor L1 flows to the ground through the resistor RS7 and the resistor RS8. When the power switch M2 is turned off, the diode D2 is conductive, and thus a current of the inductor L1 is supplied to a load (not shown) or flows to the ground through the output capacitor Co2 and the diode D2 by the energy stored in the inductor L1.

During a turn-on period of the power switch M2, a switch current Ids1 flows to the resistor RCS2, and a sense voltage VCS2 which is a voltage at a first end of the resistor RCS2 is supplied to the switch control circuit 13. During a turn-off period of the power switch M2, a sense voltage VS3 that depends on the output voltage Vo is input to the sense pin SP3.

The switch control circuit 13 generates a gate voltage VG2 according to the sense voltage CS2 and the sense voltage VS3. For example, when the sense voltage CS2 reaches the feedback voltage, the switch control circuit 13 turns off the power switch M2 and may generate the feedback voltage using the sense voltage VS2.

The sampling/holder 109 receives the sense voltage VS3 through the sense pin SP3, and samples and holds the sense voltage VS3 of the turn-off period of the power switch M2. For example, the sampling/holder 109 samples and holds the sense voltage VS3 of the turn-off period of the power switch M2 for every switching period. In detail, the sampling/holder 109 may sample the sense voltage VS3 at an instant that no current flows to the diode D2 during the turn-off period of the power switch M2, and may hold the sampled voltage.

When the held voltage reaches a voltage ($\alpha$*Vclp), the comparator 101 outputs a high level. The XNOR gate 102 outputs a low level according to the output of a comparator 101 and a low-level mode signal, which is in a disable state. Then, the first connection switch S1 is turned off and the second connection switch S2 is turned on.

Then, the sense pin SP3 is connected to the clamping circuit 105, and the sense voltage VS3 is clamped to a clamping voltage Vclp. A clamping current Iclp flows through the clamping circuit 105 and then mirrored by a current mirror circuit 103 such that a mirror current IM1 is generated. Then, a mode voltage VRM is generated as given in Equation 2.

The operation mode distinction circuit 200 receives the mode voltage VRM, and generates a plurality of mode signals mode1 to mode4, which are examples of the plurality of mode selection signals. The operation mode distinction circuit 200 transmits a mode signal enabled by the mode voltage VRM to an input terminal of the XNOR gate 102. A detailed structure of the operation mode distinction circuit 200 is the same as that of second exemplary embodiment, and therefore no further description will be provided.

When mode selection is finished and thus one of the mode signals mode1 to mode4 is enabled, all input of the XNOR gate 102 become high levels so that the first connection switch S1 is turned on and the second connection switch S2 is turned off.

Then, the sense voltage VS3 is input to an IC internal block 303, and the IC internal block 303 generates a feedback voltage according to the sense voltage VS3, and when the sense voltage CS2 reaches the feedback voltage, the power switch M2 is turned off.

A voltage for mode selection is not limited to the sense voltages of first to fourth exemplary embodiments. A voltage different from the sense voltages of first to fourth exemplary embodiments may be used for mode selection. Any voltage higher than a predetermined level (e.g., $\alpha$*Vclp) during a predetermined period may be used as a sense voltage for mode selection.

A mode selection circuit according to a fifth exemplary embodiment may uses a line voltage for mode selection. The line voltage is a voltage rectified from an AC input and follows on a sine wave. One cycle of the line voltage is very long compared to one power switching cycle, and therefore the line voltage is higher than a predetermined level (e.g., $\alpha$*Vclp) during a predetermined period (e.g., several switching cycles of the power switch).

Figure 5:
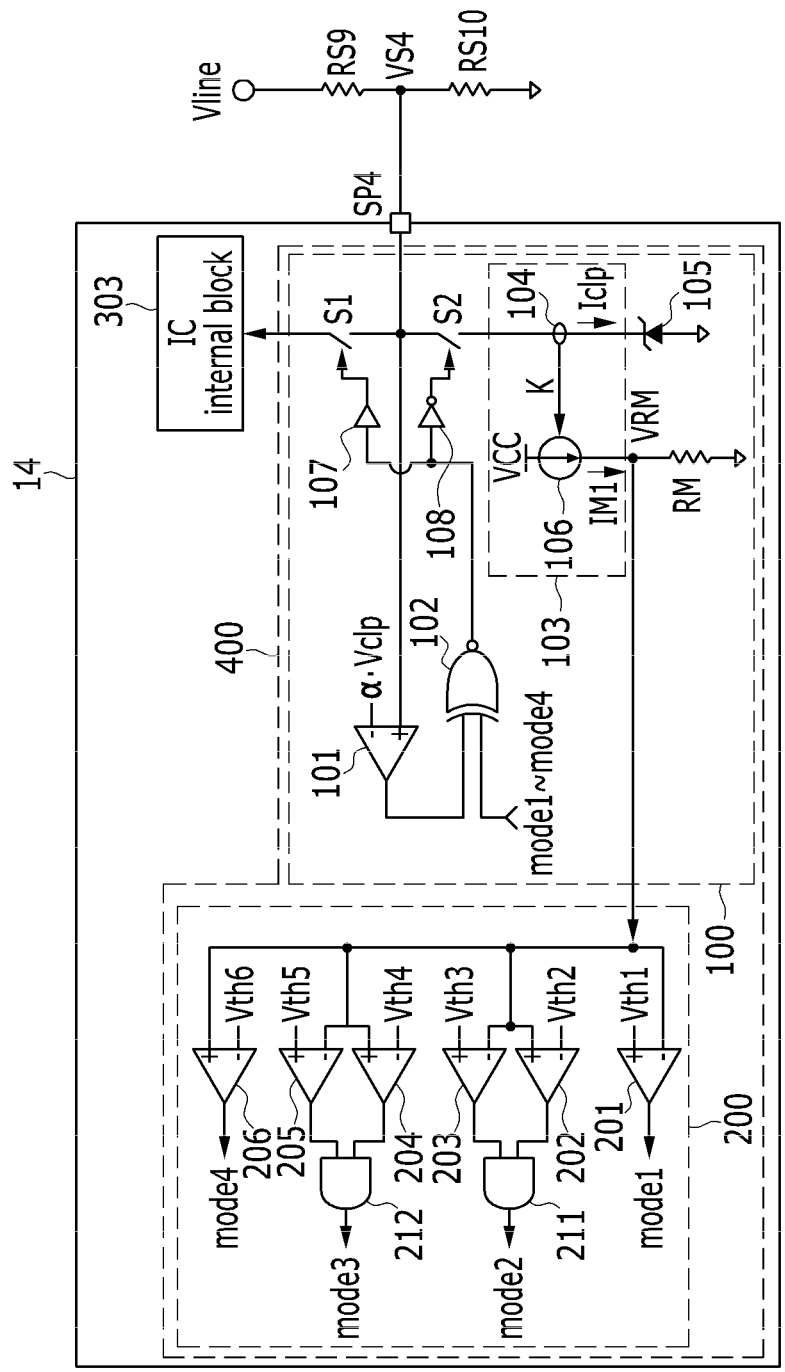
FIG. 5 shows a switch control circuit according to a fifth exemplary embodiment.

FIG. 5 shows a switch control circuit according to the fifth exemplary embodiment.

A switch control circuit 14 includes an IC internal block 305 and a mode selection circuit 400.

As shown in FIG. 5, two resistors RS9 and RS10 are connected in series between a line voltage Vline and a ground. A node where the two resistors RS9 and RS10 are connected is connected to a sense pin SP4, and a voltage at the node is a sense voltage VS4.

When the sense voltage VS4 reaches a voltage ($\alpha$*Vclp), a comparator 101 outputs a high level. An XNOR gate 102 outputs a low level according to the output of the comparator 101 and a low-level mode signal which is in a disable state. Then, a first connection switch S1 is turned off and a second connection switch S2 is turned on.

Then, the sense pin SP4 is connected to a clamping circuit 105, and the sense voltage VS4 is clamped to a clamping voltage Vclp. A clamping current Iclp flows through the clamping circuit 105 and mirrored by a current mirror circuit 103 such that a mirror current IM1 is generated. Then a mode voltage VRM is generated as given in Equation 2.

The operation mode distinction circuit 200 receives the mode voltage VRM, and generates a plurality of mode signals mode1 to mode4 which are examples of mode selection signals. The operation mode distinction circuit 200 transmits a mode signal enabled by the mode voltage VRM to an input terminal of the XNOR gate 102. A detailed structure of the operation mode distinction circuit 200 is the same as that of the second exemplary embodiment, and therefore no further description will be provided.

When a mode is selected and one of the mode signals mode1 to mode4 is enabled, all inputs of the XNOR gate 102 become high levels so that the first connection switch S1 is turned on and the second connection switch S2 is turned off.

Then, the sense voltage VS4 is input to the IC internal block 305 and the IC internal block 305 senses the line voltage Vline according to the sense voltage VS4.

In the first to fifth exemplary embodiments, mode selection is performed through the sense pin, but an exemplary embodiment is not limited thereto.

Instead of using the sense pin, a gate pin to which a gate voltage is supplied may be used for mode selection.

Figure 6:
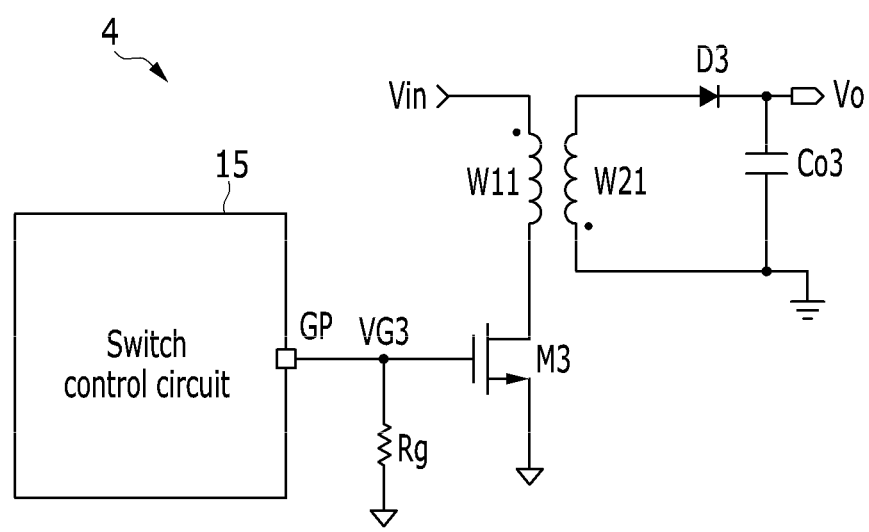
FIG. 6 shows a power supply.

FIG. 6 shows a power supply.

A power supply 4 includes a power switch M3, a primary side wire W11, a secondary side wire W21, a diode D3, an output capacitor Co3, a resistor Rg, and a switch control circuit 15.

An input voltage Vin is connected to a first end of the primary side wire W11 and a second end of the primary side wire W11 is connected to a drain of the power switch M3. A first end of the secondary side wire W21 is connected with an anode of the diode D3, and a cathode of the diode D3 is connected to an output voltage Vo. An output capacitor Co is connected between the output voltage Vo and a secondary ground.

A source of the power switch M3 is connected to a primary ground, a gate of the power switch M3 is connected to a gate pin GP and performs switching operation by a gate voltage VG3 supplied from the switch control circuit 15. The resistor Rg is connected between the gate pin GP and the primary ground.

The switch control circuit 15 includes the gate pin GP and generates the gate voltage VG3.

Figure 7:
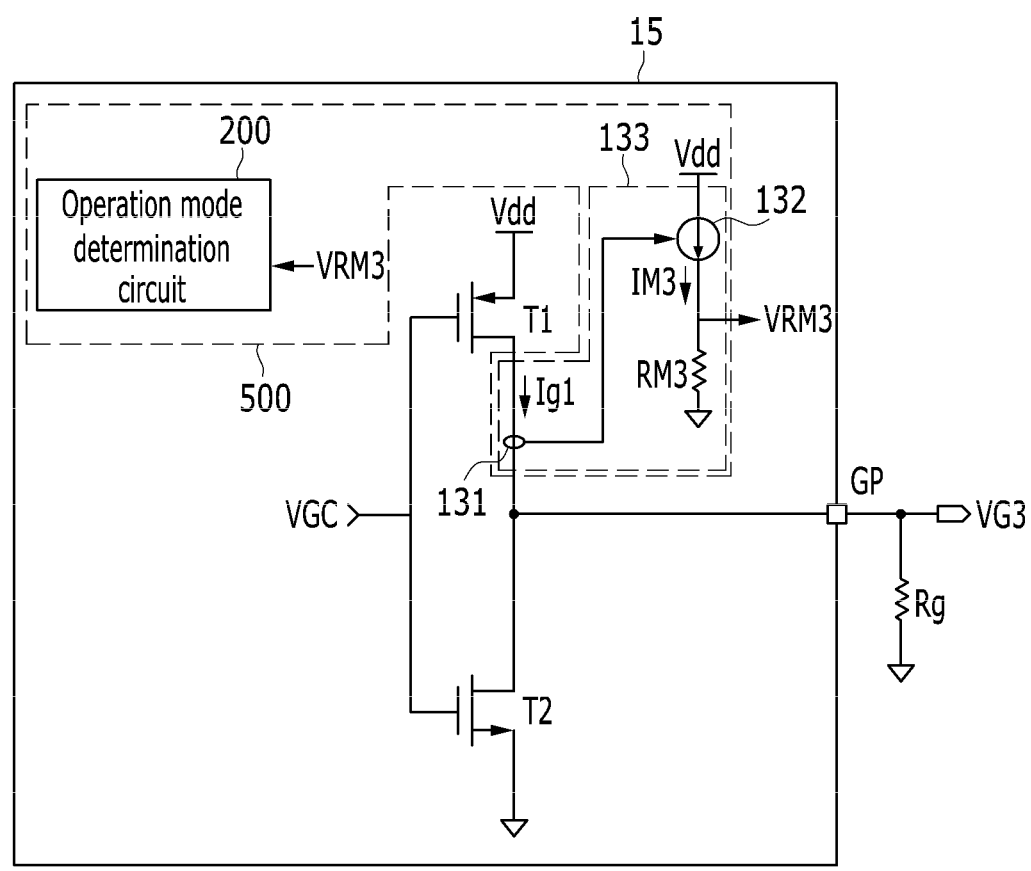
FIG. 7 shows a switch control circuit according to a sixth exemplary embodiment.

FIG. 7 shows a switch control circuit according to a sixth exemplary embodiment.

A switch control circuit 15 includes a mode selection circuit 500, a transistor T1, and a transistor T2.

The transistor T1 and the transistor T2 has a push-pull structure, and operates according to a gate control signal VGC. A source of the transistor T1 is connected to a voltage Vdd, a drain of the transistor T1 and a drain of the transistor T2 are connected with each other, and a source of the transistor T2 is connected to the primary side ground. The gate control signal VGC is input to a gate of the transistor T1 and a gate of the transistor T2.

When the transistor T2 is turned on according to a high-level gate control signal VGC, the gate voltage VG3 becomes low level so that the power switch M3 is turned off, and when the transistor T1 is turned on according to a low-level gate control signal VGC, the gate voltage VG3 becomes high level so that the power switch M3 is turned on.

The mode selection circuit 500 generates a mode voltage VRM3 by mirroring a current supplied to the resistor Rg, and selects a mode according to the mode voltage VRM3. The mode selection circuit 500 includes a current mirror circuit 133, a resistor RM3, and an operation mode distinction circuit 200. The operation mode distinction circuit 200 has the same structure of the operation mode distinction circuit of the previous exemplary embodiments.

The current mirror circuit 133 includes a current sensing unit 131 and a current source 132. A current Ig1 flowing through the current sensing unit 131 is mirrored with a predetermined mirror ratio and then transmitted to the current source 132, and the current source 132 generates a mirror current IM3. The mirror current IM3 flows to the resistor RM3 so that the mode voltage VRM3 is generated.

The operation mode distinction circuit 200 selects a mode according to the mode voltage VRM3.

The current Ig1 flows to the primary side ground through the resistor Rg when the gate pin GP is connected to the voltage Vdd as the transistor T1 is turned on. That is, the current Ig1 is Vdd/Rg. Thus, the current Ig1 can be controlled by controlling the resistor Rg, and therefore the mode voltage VRM3 can be controlled by controlling the resistor Rg. That is, a mode can be selected by controlling the resistor Rg.

Figure 8:
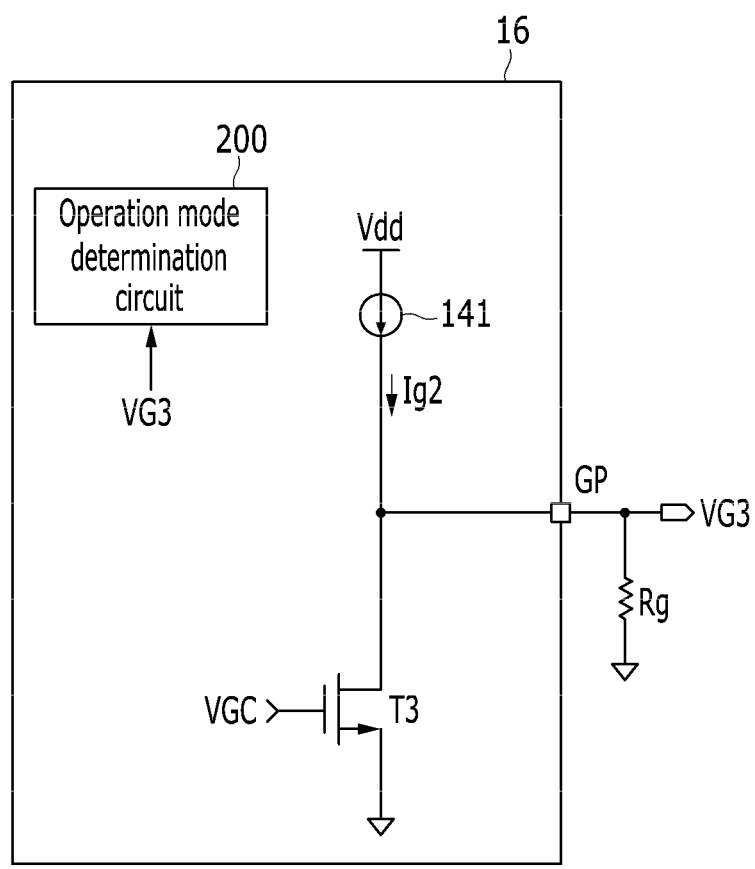
FIG. 8 shows a switch control circuit according to a seventh exemplary embodiment.

FIG. 8 shows a switch control circuit according to a seventh exemplary embodiment.

A switch control circuit 16 shown in FIG. 8 may be applied to the power supply of FIG. 6.

The switch control circuit 16 includes a current source 141, a transistor T3, and an operation mode distinction circuit 200.

The current source 141 generates a current Ig2 using the voltage Vdd. The transistor T3 is connected to the current source 141 and a primary side ground, and performs switching operation according to a gate control signal. A gate voltage VG3 is determined according to the gate control signal VGC supplied to a gate of the transistor T3.

When the transistor T3 is turned on by a high-level gate control signal VGC, the gate voltage VG3 becomes low level and the power switch M3 is turned off. When the transistor T3 is turned off by a low-level gate control signal VGC, a current Ig2 flows to the resistor Rg so that the gate voltage VG3 becomes a level of Ig2*Rg and the power switch M3 is turned off.

The operation mode distinction circuit 200 selects a mode according to the gate voltage VG3. Since a level of the gate voltage VG3 is determined according to the resistor Rg, the mode can be selected by controlling the resistor Rg.

In the above-described exemplary embodiments, the element connected to the multi-pin and the element generating the mode voltage are described as resistors, but the exemplary embodiments are not limited thereto. Instead of using a resistor, an active element such as a capacitor may be used.

Figure 9:
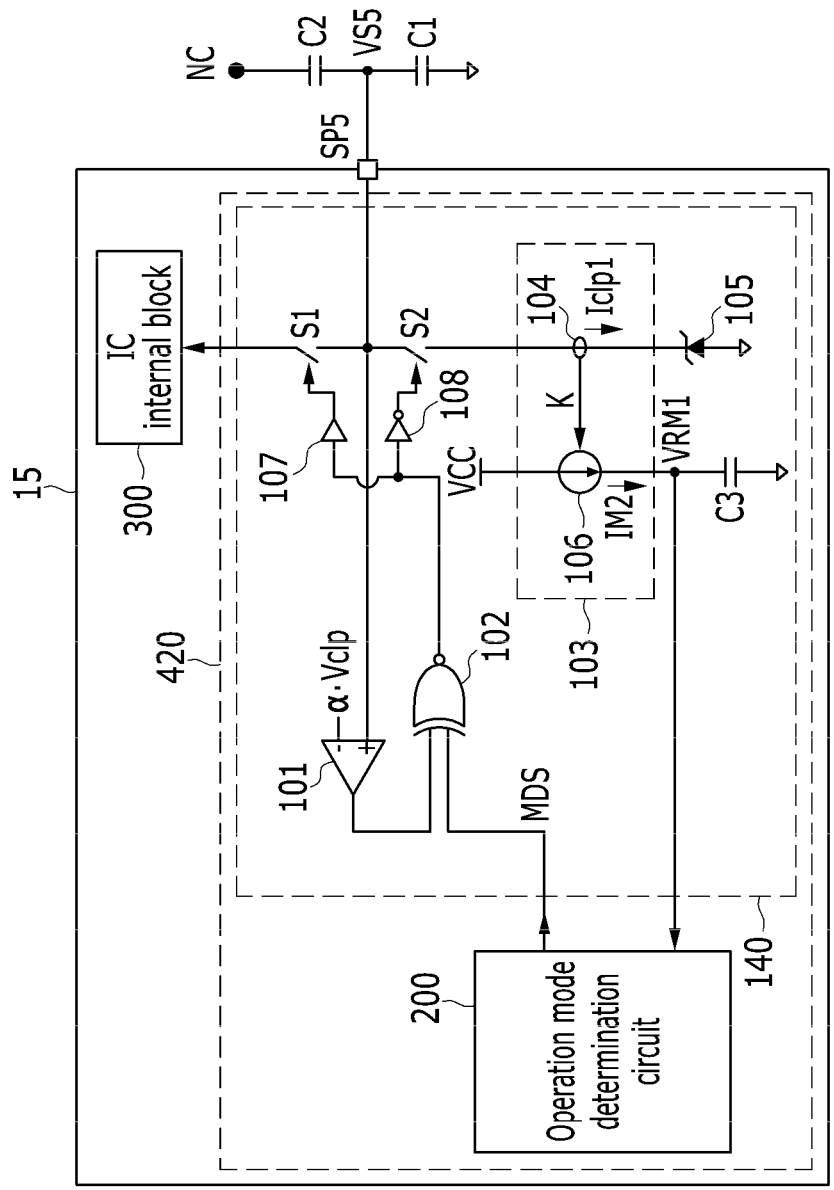
FIG. 9 shows a switch control circuit according to an eighth exemplary embodiment.

FIG. 9 shows a switch control circuit according to an eighth exemplary embodiment.

Compared to the first exemplary embodiment shown in FIG. 1, capacitors C1, C2, and C3 may be used instead of using resistors RS1, RS2, and RN.

A voltage at a node NC is divided through two capacitors C1 and C2 that are connected in series and a sense voltage VS5 is connected to a sense pin SP5.

As shown in FIG. 9, the switch control circuit 15 includes a mode selection circuit and an IC internal block 300. The mode selection circuit 420 includes a mode voltage generator 140 and an operation mode distinction circuit 200.

The mode voltage generator 140 generates a mirror current IM2 by mirroring a clamping current Iclp1 generated when the sense voltage VR5 supplied through the sense pin SP5 is clamped. The capacitor C3 is charged by the mirror current IM2 so that a mode voltage VRM1 is generated.

When the two serially-connected capacitors C1 and C2 respectively control their capacitances, the sense voltage VS5 is changed. That is, the mode voltage VRM1 can be controlled by controlling capacitance of each of the two serially-connected capacitors C1 and C2.

Other descriptions are the same as the descriptions of the previous exemplary embodiments, and therefore no detailed description will be provided.

Instead of using the resistor Rg shown in FIG. 7 and FIG. 8, a capacitor may be connected. Then, in the sixth exemplary embodiment shown in FIG. 7, a current charging the capacitor according to the voltage Vdd is mirrored so that the mode voltage VRM3 can be generated. In addition, in the seventh exemplary embodiment shown in FIG. 8, the gate voltage VG3 generated when the capacitor is charged by the current Ig2 may be input as a mode voltage to the operation mode distinction circuit 200.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10, 11, 12, 13, 14, 15, 16: switch control circuit
400, 410, 420: mode selection circuit
100, 120, 140: mode voltage generator
200: operation mode distinction circuit
300, 302, 303, 305: IC internal block

What is claimed is:

1. A mode selection circuit comprising:
   a mode voltage generator configured to generate a mode voltage according to a clamping current that flows when a voltage of a multi-pin is clamped to a predetermined clamping voltage; and
   an operation mode distinction circuit configured to select one of a plurality of mode signals according to the mode voltage,
   wherein the mode voltage is controlled according to a passive element connected to the multi-pin,
   wherein the mode voltage generator comprises:
      a comparator configured to compare the voltage of the multi-pin with a predetermined reference voltage; and
      a clamping circuit configured to clamp the voltage of the multi-pin to the clamping voltage, wherein connection between the clamping circuit and the multi-pin is controlled according to an output of the comparator and an enabled mode signal among the plurality of mode signals.

2. The mode selection circuit of claim 1, wherein the mode voltage generator comprises a connection switch connected between the multi-pin and the clamping circuit, and is configured to turn on the connection switch according to the output of the comparator and turn off the connection switch according to the enabled mode signal.

3. The mode selection circuit of claim 2, further comprising:
   a logic operation unit configured to turn on the connection switch according to the output of the comparator when the voltage of the multi-pin reaches the predetermined reference voltage and turn off the connection switch according to the enabled mode signal.

4. The mode selection circuit of claim 1, further comprising:
   a current mirror circuit configured to generate a mirror current by mirroring the clamping current; and
   a resistor to which the mirror current flows, wherein the mode voltage is a voltage generated in the resistor.

5. The mode selection circuit of claim 1, wherein the operation mode distinction circuit comprises:
   a plurality of first comparators configured to compare whether the mode voltage is lower than a corresponding threshold voltage among a plurality of first threshold voltages;
   a plurality of second comparators configured to compare whether the mode voltage is higher than a corresponding threshold voltage among a plurality of second threshold voltages; and
   a plurality of logic operation units configured to perform logic operation on an output of a third comparator among the plurality of first comparators and an output of a fourth comparator among the plurality of second comparators,
   wherein the plurality of mode signals comprise outputs of the plurality of logic operation units.

6. The mode selection circuit of claim 5, wherein the plurality of mode signals comprise:
   an output of a fifth comparator among the plurality of first comparators comparing a lowest first threshold voltage among the plurality of first threshold voltages with the mode voltage; and
   an output of a sixth comparator among the plurality of second comparators comparing a highest second threshold voltage among the plurality of second threshold voltages with the mode voltage.

7. The mode selection circuit of claim 1, wherein the mode voltage generator further comprises:
   a sampling/holder configured to sample the voltage of the multi-pin for a predetermined period and hold the sampled voltage, and controls connection between the clamping circuit and the multi-pin according to a result of comparison between the sampled voltage and a predetermined reference voltage.

8. A switch control circuit controlling switching operation of a power switch, comprising:
   a multi-pin connected to a passive element; and
   a mode selection circuit configured to generate a mode voltage according to a clamping current flowing when a voltage of the multi-pin is clamped to a predetermined clamping voltage and select one of a plurality of mode signals according to the mode voltage,
   wherein the switch control circuit further comprises a first connection switch connected between the multi-pin and an internal block of the switch control circuit, the mode selection circuit comprising:
      a clamping circuit configured to clamp the voltage of the multi-pin to the clamping voltage; and
      a second connection switch connected between the multi-pin and the clamping voltage, wherein the mode selection circuit controls switching operation of the first and second connection switches according to an enabled mode signal among the plurality of mode signals and a result of a comparison between the voltage of the multi-pin and a predetermined reference voltage.

9. The switch control circuit of claim 8, wherein the mode selection circuit further comprises:
a logic operation unit that turns off the first connection switch and turns on the second connection switch according to the result of the comparison when the voltage of the multi-pin reaches the predetermined reference voltage, and turns on the first connection switch and turns off the second connection switch according to an enabled mode selection signal among the plurality of mode signals.

10. The switch control circuit of claim 8, wherein the mode selection circuit comprises:
a current mirror circuit configured to generate a mirror current by mirroring the clamping current; and
a resistor to which the mirror current flows, wherein the mode voltage is a voltage generated in the resistor.

11. The switch control circuit of claim 8, wherein the mode selection circuit comprises:
a plurality of first comparators configured to compare whether the mode voltage is lower than a corresponding first threshold voltage among a plurality of first threshold voltages;
a plurality of second comparators configured to compare whether the mode voltage is higher than a corresponding second threshold voltage among a plurality of second threshold voltages; and
a plurality of logic operation units configured to perform logic operation on an output of a third comparator among the plurality of first comparators and an output of a fourth comparator among the plurality of second comparators,
wherein the plurality of mode signals comprise outputs of the plurality of logic operation units.

12. The switch control circuit of claim 11, wherein the plurality of mode signals comprise:
an output of a fifth comparator among the plurality of first comparators comparing a lowest first threshold voltage among the plurality of first threshold voltages with the mode voltage; and
an output of a sixth comparator among the plurality of second comparators comparing a highest second threshold voltage among the plurality of second threshold voltages with the mode voltage.

13. The switch control circuit of claim 8, wherein the multi-pin is connected to an output voltage of a power supply that includes the power switch.

14. The switch control circuit of claim 8, wherein the multi-pin is connected to a line voltage.

15. The switch control circuit of claim 8, wherein the mode voltage is controlled according to the passive element.

16. A switch control circuit controlling switching operation of a power switch, comprising:
a gate-pin connected to a gate of the power switch and a first resistor;
a voltage source connected to the gate pin through a switch; and
a mode selection circuit configured to generate a mode voltage according to a first current flowing between the voltage source and the gate-pin when the power switch is turned on, and select one of a plurality of mode signals according to the mode voltage, wherein the first current is determined according to the voltage source and the first resistor.

17. A switch control circuit controlling switching operation of a power switch, comprising:
a gate pin connected to a gate of the power switch and a first resistor;
a current source connected to the gate pin; and
a mode selection circuit configured to select one of a plurality of mode signals according to a gate voltage that turns on the power switch, wherein the gate voltage is determined according to the first resistor and a current of the current source.

18. A mode selection circuit comprising:
a mode voltage generator configured to generate a mode voltage according to a clamping current that flows when a voltage of a multi-pin is clamped to a predetermined clamping voltage; and
an operation mode distinction circuit configured to select one of a plurality of mode signals according to the mode voltage,
wherein the mode voltage is controlled according to a passive element connected to the multi-pin,
wherein the mode voltage generator further comprises:
a clamping circuit configured to clamp the voltage of the multi-pin to a predetermined clamping voltage when being connected to the multi-pin; and
a sampling/holder configured to sample the voltage of the multi-pin for a predetermined period and hold the sampled voltage, and controls connection between the clamping circuit and the multi-pin according to a result of comparison between the sampled voltage and a predetermined reference voltage.

19. A switch control circuit controlling switching operation of a power switch, comprising:
a multi-pin connected to a passive element; and
a mode selection circuit configured to generate a mode voltage according to a clamping current flowing when a voltage of the multi-pin is clamped to a predetermined clamping voltage and select one of a plurality of mode signals according to the mode voltage,
wherein the mode selection circuit comprises:
a clamping circuit configured to clamp the voltage of the multi-pin to a
predetermined clamping voltage when being connected to the multi-pin; and
a sampling/holder configured to sample the voltage of the multi-pin for every switching cycle of the power switch during a turn-off period of the power switch and holding the sampled voltage, and controls connection between the clamping circuit and the multi-pin according to a result of a comparison between the sampled voltage and a predetermined reference voltage.

20. The switch control circuit of claim 19, wherein the multi-pin is connected to an auxiliary wire coupled to a primary side wire that is connected to the power switch.

* * * * *